April 26, 1949.
S. J. LEVINE
2,468,119
LIQUID LEVEL RESPONSIVE HYDRODYNAMIC
FAIL SAFE CONTROL
Filed Nov. 14, 1946
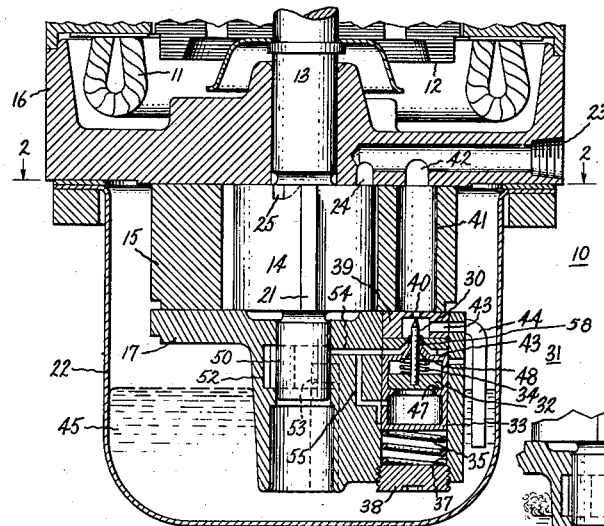
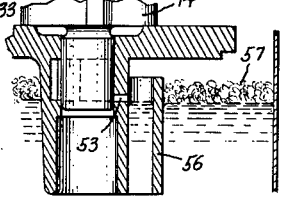
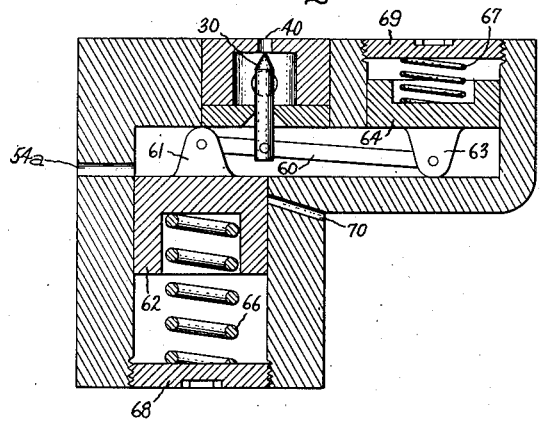
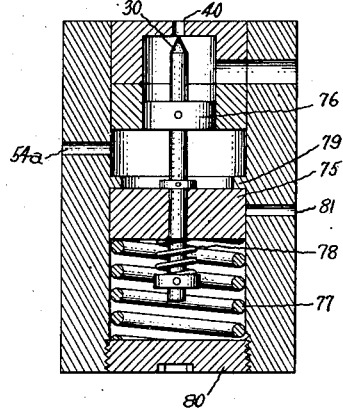
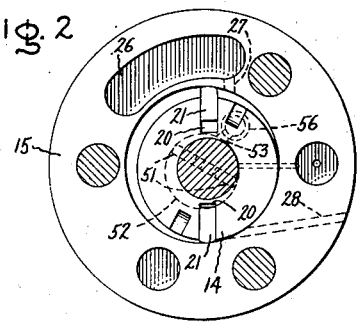
Inventor:
Samuel J. Levine,
by Edwin L. Rich
His Attorney.

Patented Apr. 26, 1949

2,468,119

UNITED STATES PATENT OFFICE 2,468,119

LIQUID LEVEL RESPONSIVE HYDRODYNAMIC FAIL SAFE CONTROL

Samuel J. Levine, West Orange, N. J., assignor to General Electric Company, a corporation of New York Application November 14, 1946, Serial No. 709,854

8 Claims. (Cl. 103—21)

The invention relates to automatic liquid level control and provides an improved fail safe form of hydrodynamic flow control mechanism suitable for oil burner or other service where a predetermined liquid level is to be maintained and not substantially exceeded.

The invention provides flow responsive fail safe biasing improvements for the improved floatless form of hydrodynamic liquid level control disclosed and claimed in the Schultz application Serial No. 705,536 filed October 25, 1946.

When the liquid level in a flow chamber or reservoir is controlled by the improved floatless form of liquid level responsive control as disclosed and claimed in the above Schultz application, any failure of the hydrodynamically operated piston or bellows to respond differentially to the flow of liquid instead of gas so as to reversely operate the liquid level control means when the liquid rises above the desired level may result in excessive flooding of the flow chamber or reservoir with consequential dangers and difficulties.

The principal object of the present invention is to provide an improved specially biased form of hydrodynamically operated liquid level control so as to insure that the flow responsive liquid level control in case of failure thereof will automatically be biased to fail safe.

Another object is to provide complementary oppositely acting unbalanced biasing mechanisms sequentially operable hydrodynamically against the bias thereof and interconnected for selectively biasing the liquid level control element in opposite directions so that the stronger biasing mechanism will respond to the normal variations in the liquid level to reversely operate the liquid level control element while the weaker and oppositely acting biasing mechanism will bias the control element to a predetermined fail safe position when the normal hydrodynamic actuating mechanism is ineffective.

Further objects and advantages of the invention will appear in the following description of the accompanying drawing in which Fig. 1 is a sectional view of an electric motor driven oil burner pumping mechanism provided with the improved fail safe form of liquid level responsive hydrodynamic pumping control of the present invention; Fig. 2 is a sectional view of the rotary blade pump mechanism shown in Fig. 1 looking in the direction of the arrow 2—2; Fig. 3 is a partial sectional view of the shielded auxiliary pump inlet structure of Fig. 1 showing more clearly the details of construction; Fig. 4 is a modified form of fail safe liquid level responsive double opposed fail safe hydrodynamic control mechanism of the present invention; and Fig. 5 is a sectional view of a further modified form of liquid level responsive double opposed hydrodynamic fail safe control of the present invention.

Referring to Fig. 1, the rotary piston pumping mechanism indicated generally by the reference character 10 is of the type adapted to supply oil and air under pressure to an oil burner atomizing nozzle as more fully described and claimed in the Lum Patent 2,032,291.

Only a portion of the electric motor for driving the combined oil and air pumping mechanism 10 is illustrated in Fig. 1, namely, the electric motor stator coils 11, the motor rotor 12 mounted on shaft 13, that carries the main pump rotor 14, eccentrically within the cylinder body 15 between the upper end plate 16 and the lower end plate 17. As shown in Fig. 2, the pump rotor 14 is provided with the opposed slots 20 carrying the cylinder sealing blades 21 therein. As more fully described in the above mentioned Lum patent the upper and lower end plates 16 and 17 are provided with suitable oil and air inlet and outlet passages communicating with the space inside the cylinder body 15 so that both oil and air are pumped under pressure into the pressure sump or reservoir 22 to be supplied therefrom to an atomizing burner nozzle not shown.

As shown in Fig. 1, the oil inlet passage 23 is formed in the upper end plate 16 with the port 24 located adjacent the path of oil inlet groove 25 formed radially in the top face of the pump rotor 14 so as to connect the oil inlet passage 23 with the vacuum space behind the blades 21 as long as each of the grooves 25 registers with the port 24. Thus upon rotation of the rotor 14 in a counterclockwise direction as indicated by the arrow in Fig. 2, the pump 10 exerts a suction on the oil inlet passage 23 so as to pump oil from a main storage reservoir (not shown) into the pressure sump 22. Likewise, air is pumped from the air inlet surge chamber 26 shown in Fig. 2 through the lateral air inlet port 27 into the space behind the blades 21 and both oil and air under pressure are discharged from the pump cylinder through the outlet passage 28 into the sump 22.

In order to maintain a predetermined oil level inside the sump 22, the by-pass valve 30 is provided for controlling the suction of the oil inlet passage 23 so as to thereby vary the oil pumping rate. In carrying the present invention into effect, as shown in Fig. 1, the oil by-pass valve 30 is operated by an improved hydrodynamic mechanism indicated generally by the reference character 31.

In the form shown in Fig. 1, the valve 30 is operated by a pair of oppositely acting pistons 32 and 33 each having a corresponding biasing spring 34 and 35 for oppositely biasing the valve 30. The pistons 32 and 33 and also the springs 34 and 35 are unbalanced so that one may predominate over the other. Thus, the weaker spring 34 serves to bias valve 30 to the open position in which it is shown. However, piston 32 can overcome or counteract spring 34 so as to enable stronger spring 35 to bias the valve 30 to the closed position.

However, the stronger spring 35 in turn is overcome or counteracted by the larger piston 33 so as to again operate valve 30 to the open position, as will be more fully described hereinafter in connection with the operation.

As shown, piston 33 operates inside the cylinder 37 formed in the lower end plate 17 of the pump and is biased by the stronger spring 35 when plug 38 is screw-threaded into the end of cylinder 37 to engage with the plug 39 located in the upper end of the cylinder 37 and having the valve port 40 communicating through passages 41 and 42 with the oil inlet passage 23. The upper plug 39 also is provided with a side passage 43 communicating with the tube 44 that extends below the surface of the liquid 45 in the sump.

As shown, the larger piston 33 is hollow so as to carry the smaller piston 32 inside the larger piston 33 for operation between the annular stop 47 and the upper stop 48. The auxiliary pump 50 is provided with the two sealing blades 51 as indicated in Fig. 2 for operation in the eccentrically disposed pump cylinder 52 upon operation of the main oil pump 14. A flow inlet opening 53 is provided at a predetermined level for the oil in sump 22 so as to admit air into the auxiliary pump cylinder 52 when the oil is below the level of opening 53 and to admit oil into the auxiliary pump cylinder 52 when the oil level rises above the inlet 53.

As shown in Fig. 3, the auxiliary pump flow inlet 53 preferably is enclosed within a shield 56 in order to insure that oil free from froth or foam 57 is admitted into the inlet 53.

The auxiliary pump outlet 54 communicates directly with the space in cylinder 37 above the top of piston 33. Thus, piston 33 will respond when a sufficient pressure is built up within the passage 54 to move against the bias of the stronger biasing spring 35. The auxiliary pump outlet 54 also communicates through passage 55 with the space inside the hollow piston 33 below the enclosed piston 32 so as to transmit the fluid pressure developed by the auxiliary pump 50 to actuate piston 32.

*Operation of Fig. 1*

Upon operation of the rotary pump 14, suction is created in the oil inlet 23 to draw oil from a tank, not shown, into the main pump cylinder and discharge the oil along with compressed air into the sump 22 at the same time auxiliary pump 50 is operated. When the oil in the sump is below the level of inlet 53, then air is pumped by auxiliary pump 50 and an air pressure is built up in passage 54. However, the air is bled away around the bearing 58 for the valve 30 sufficiently that there is not enough pressure developed to operate the larger piston 33 against the bias of stronger spring 35. However, the air pressure developed is sufficient to cause the inside piston 32 to compress the weaker biasing spring 34 and thus move the valve 30 to close the port 40. Consequently, with valve 30 closed, the suction exerted on the oil inlet 23 will be increased so that the main pump 14 will effectively operate to raise the oil level inside of sump 22.

When the oil level rises to the level of opening 53, then auxiliary pump 50 will begin to pump oil and thereby increase the pressure communicated through passage 54 to the top of the large piston 33 and thus operate piston 33 against the bias of the stronger biasing spring 35 so as to move valve 30 away from port 40. As a result, oil is by-passed directly from sump 22 into oil inlet 23 so as to reduce the oil level in the sump. In this way, valve 30 will be positioned by the response of piston 33 to the pressure developed by auxiliary pump 50 so as to maintain the oil level inside of sump 22 substantially coincident with the auxiliary inlet opening 53.

In case through plugging, wear, or any other reason, the auxiliary pump 50 should fail to develop a suction through inlet opening 53, then the pressure at the auxiliary pump outlet passage 54 would decrease substantially to zero and the weaker spring 34 then would become effective to restore piston 32 to the position in which it is shown and in this way bias the liquid level control valve 30 for operation in the direction corresponding to the liquid rising above the auxiliary inlet opening 53 entirely irrespective of whether the inlet opening is above or below it. Consequently, in case of failure of the hydrodynamically actuated liquid level control including the auxiliary pump 50, then the valve 30 will be biased to its flow decreasing position so as to prevent flooding of the sump 22.

In the modified form of fail safe liquid level control valve mechanism illustrated in Fig. 4, valve 30 is mounted to be actuated by a whiffletree arm 60, one end of which is pivotally carried in a clevis 61 on the main piston 62 and the other end of which is carried in a clevis 63 on the oppositely acting unbalanced piston 64. Then piston 62 is biased to the position in which it is shown by the relatively strong biasing spring 66 while the oppositely acting piston 64 is biased to the position in which it is shown by the relatively weaker biasing spring 67. The biased springs 66 and 67 are held in operative engagement with their respective pistons by means of the screw plugs 68 and 69 respectively.

*Operation of Fig. 4*

It will be understood that pressure is communicated from the auxiliary pump 50 through passage 54a so as to subject both pistons 62 and 64 to the pressure developed by the auxiliary pump. Thus, even though the pressure is below that required to operate piston 62 against the bias of the strong spring 66, nevertheless piston 64 will be operated against the bias of the weaker spring 67. As a result, clevis 63 will be raised so as to tilt the whiffletree arm 60 about clevis 61 as an axis and thereby move valve 30 to close port 40. In the manner previously indicated, the closure of valve 30 will serve to increase the amount of oil supplied to sump 22. Consequently, when the oil level rises above the auxiliary pump inlet 53, then the pressure developed by the auxiliary pump will increase sufficiently to operate piston 62 against the passage of the stronger spring 66 and in this way retract valve 30 from port 40. Under these conditions, oil will be drawn from the sump and the suction at the oil inlet 23 will be decreased so as to cause the level of the oil in sump 22 to fall below the auxiliary pump inlet opening 53 with a resulting decrease in pressure exerted on piston 62 and a reclosure of valve 30. As soon as piston 62 moves to expose the pressure relief passage 70, then further movement of the piston 62 will be stopped. In this way, the piston 62 will cooperate with the auxiliary pump to operate the valve 30 so as to maintain the oil in sump 22 substantially at the level of the auxiliary pump inlet opening 53.

In case of plugging of the opening 53 or excessive wear of auxiliary pump 50 or for any other cause, no substantial pressure is exerted on passage 54a, then the weak spring 67 will return the piston 64 to its position in which it is shown and thereby tilt whiffltree arm 60 so as to open valve 30. This in turn will decrease the suction exerted by the main pump 14 sufficiently to prevent flooding in the sump 22.

In the modified form of fail safe biasing liquid level control mechanism shown in Fig. 5, valve 30 is actuated by the oppositely actuating unbalanced pistons 75, 76 and biasing springs 77 and 78. Piston 75 is biased by a stronger biasing spring 77 into engagement with the annular stop 79 when spring 77 is compressed by means of the screw plug 80. The valve stem 38 extends through piston 75 with a running seat so as to be biased into the position shown by the weaker biasing spring 78.

Operation of Fig. 5

When pressure from the auxiliary pump is communicated through passage 54a, piston 76 will respond to compress biasing spring 78 and thereby move valve 30 to close port 40. When the liquid level rises above the inlet opening 53, then the pressure communicated through passage 54a will become sufficient to operate the piston 75 against the bias of the stronger biasing spring 72 and thereby open valve 30. Then the movement of piston 75 will be stopped when the pressure relief passage 81 is uncovered. The opening of valve 30 will serve to reduce the level of the oil in sump 22 in the manner previously described. Consequently, the biasing spring 77 will return piston 75 and valve 30 towards the position in which port 40 is closed. In this way valve 30 will be positioned so as to maintain the oil in sump 22 at a level determined by the auxiliary pump inlet opening 53.

In case, for any reason, the auxiliary pump should fail to develop a pressure, then the weaker biasing spring 78 will become effective to insure that valve 30 is moved to the opened position, whereby flooding of the sump 22 is prevented.

What I claim as new and desire to secure by Letters Patent of the United States is:

1. A fail safe liquid level control system having in combination means including a movable element for regulating the liquid level, means biasing said element to move to a predetermined safe position, suction means having a flow passage provided with an inlet opening at a predetermined desired level for the liquid, means responsive to fluid flow through said passage for rendering said biasing means ineffective, and means responsive differentially to the flow of gas and liquid through said passage for operating said element when said biasing means is ineffective and the liquid rises above and falls below said inlet opening.

2. A fail safe liquid level control system having in combination means including a reversely movable element for regulating the liquid level, suction means having a flow passage provided with an inlet opening at a predetermined desired level for the liquid, means responsive differentially to the flow of gas and liquid through said passage for operating said element to different positions when the liquid rises above and falls below said inlet opening, means for biasing said element for operation into a position corresponding to the liquid rising above said inlet opening when said differential responsive means is ineffective and means responsive to the flow of gas and liquid through said passage for rendering said biasing means ineffective when said differential responsive means is effective.

3. A fail safe liquid level control system having in combination, means for regulating liquid level including a movable control element having a level increasing position and a level decreasing position, opposing biasing means for said element, each for biasing said element to a corresponding one of said positions, a separate hydrodynamic responsive means for opposing each one of said biasing means, and suction means having a flow inlet disposed at a predetermined liquid level for rendering one of said hydrodynamic responsive means effective only when the liquid rises above said inlet and the other of said hydrodynamic responsive means effective only when said suction means is effective.

4. A fail safe liquid level control mechanism having in combination differential gas and liquid flow responsive means having a flow inlet opening at a predetermined level for the liquid, flow regulating means controlled by said flow responsive means for reversely varying the rate of liquid flow when the liquid rises above and falls below said inlet opening, and flow responsive biasing means for biasing said element for operation in a predetermined direction corresponding to the liquid rising above said inlet level when said differential flow responsive means is ineffective.

5. A liquid level control system having in combination plural means for producing liquid flow, one having a flow inlet for providing a flow rate dependent upon variations in the level of the liquid flow produced by the other, means responsive to the flow rate of said one means for regulating the liquid flow rate of said other means selectively to counteract said liquid level variations, and flow responsive means for biasing said liquid flow rate control means to provide a minimum rate of flow when said one flow producing means is ineffective.

6. A liquid level control mechanism having in combination liquid flow responsive means having a flow inlet opening at a predetermined level for the liquid, and pumping means having rate varying means controlled by said flow responsive means for reversely varying the pumping rate when the liquid rises above and falls below said opening, and flow responsive biasing means for biasing said pumping rate varying means to provide the minimum rate of flow when said first flow responsive means is ineffective.

7. In combination, means including a valve for regulating the liquid level, suction means having a flow passage provided with an inlet opening at a predetermined desired level for the liquid, pressure responsive means responsive to the pressure variations produced upon flow of gas and liquid through said passage for reversely operating said valve when the liquid rises above or falls below said inlet opening, and pressure responsive biasing means for biasing said valve in the direction corresponding to the liquid rising above said inlet opening when said suction means is ineffective.

8. In combination, a container for liquid having means including a valve for regulating the liquid level therein, means providing a flow passage having a flow inlet opening at a predetermined level inside said container, means responsive selectively to the flow of gas and liquid through said passage for reversely operating said valve to maintain the liquid in said container substantially at said predetermined level, and flow responsive biasing means for biasing said valve to provide a minimum liquid level in said container when said selective flow responsive means is ineffective.

SAMUEL J. LEVINE.

REFERENCES CITED

The following references are of record in the file of this patent:

UNITED STATES PATENTS

| Number | Name | Date |
|---|---|---|
| 217,346 | Davis | July 8, 1879 |
| 683,630 | Westinghouse | Oct. 1, 1901 |
| 688,286 | Blevney | Dec. 10, 1901 |
| 1,530,066 | Wood | Mar. 17, 1925 |